(12) United States Patent
Shibuya et al.

(10) Patent No.: US 6,376,940 B1
(45) Date of Patent: Apr. 23, 2002

(54) DRIVE MOTOR AND DRIVE APPARATUS FOR A MOLDING MACHINE

(75) Inventors: Hiroshi Shibuya, Gunma; Satoshi Nishida, Nagano; Tokuzou Sekiyama, Gunma; Satoru Matsubara, Nagano; Atsushi Koide, Nagano; Hiroshi Yamaura, Nagano, all of (JP)

(73) Assignees: Nissei Plastic Industrial Co., Ltd., Nagano-Ken (JP); Nisso Electric Company, Kanragun (JP)

(*) Notice: Subject to any disclaimer, the term of this patent is extended or adjusted under 35 U.S.C. 154(b) by 0 days.

(21) Appl. No.: 09/253,693

(22) Filed: Feb. 22, 1999

(30) Foreign Application Priority Data

Feb. 23, 1998 (JP) .......................... 10-040512

(51) Int. Cl.[7] .......................... H02K 41/02; H02K 7/09
(52) U.S. Cl. .................. 310/12; 310/90.5; 264/40.7; 483/7; 425/145
(58) Field of Search .......................... 310/80, 112, 114, 310/83, 12, 13, 90.5; 264/40.1, 40.7; 425/145, 216; 483/7, 31

(56) References Cited

U.S. PATENT DOCUMENTS

| | | | | |
|---|---|---|---|---|
| 4,394,592 A | * | 7/1983 | Pataki | 310/12 |
| 4,758,391 A | * | 7/1988 | Shimizu et al. | 264/40.5 |
| 4,895,505 A | * | 1/1990 | Inaba et al. | 425/145 |
| 4,920,291 A | * | 4/1990 | McSparran | 310/90.5 |
| 5,196,727 A | * | 3/1993 | Isozumi et al. | 290/48 |
| 5,573,443 A | * | 11/1996 | Yasuda et al. | 451/11 |
| 5,679,384 A | * | 10/1997 | Emoto | 425/145 |
| 5,705,869 A | * | 1/1998 | Kliman et al. | 310/90.5 |
| 5,800,748 A | * | 9/1998 | Kamiguchi et al. | 264/40.1 |
| 5,817,258 A | * | 10/1998 | Ito et al. | 264/40.1 |
| 5,851,570 A | * | 12/1998 | Hayes | 425/532 |
| 5,891,485 A | * | 4/1999 | Emoto | 425/145 |
| 5,969,451 A | * | 10/1999 | Lyons et al. | 310/90.5 |
| 5,977,677 A | * | 11/1999 | Henry et al. | 310/90.5 |
| 5,980,235 A | * | 11/1999 | Eppich et al. | 425/542 |
| 6,247,913 B1 | * | 6/2000 | Shibuya et al. | 425/145 |

FOREIGN PATENT DOCUMENTS

JP      A8-25437      1/1996

* cited by examiner

Primary Examiner—Karl Tamai (57) ABSTRACT

A drive motor has a shaft supported by a casing to be rotatable and movable in the axial direction over a predetermined stroke. A portion of the shaft is utilized in order to form a rotary motor section for rotating the shaft, and another portion of the shaft is utilized in order to form an electromagnetic plunger section for moving the shaft in the axial direction. The rotary motor section and the electromagnetic plunger section are integrally built in the casing. The drive motor is used in a drive apparatus for a pre-plasticization-type injection molding machine. The front end of the shaft is connected to the rear end of a screw disposed within a barrel of a plasticizing unit of molding machine. Through axial movement of the shaft, a resin passage of the barrel is opened and closed by a valve portion provided at the front end of the screw.

11 Claims, 6 Drawing Sheets

DRIVE MOTOR AND DRIVE APPARATUS FOR A MOLDING MACHINE

BACKGROUND OF THE INVENTION

1. Field of the Invention

The present invention relates to a drive motor capable of outputting both rotary motion and linear motion, as well as to a drive apparatus for a molding machine utilizing the drive motor.

2. Description of the Related Art

Conventionally, a so-called pre-plasticization-type injection molding machine is known (see Japanese Patent Application Laid-Open (kokai) No. 8(1996)-25437. Such an injection molding machine includes a plasticizing unit for plasticizing and melting a molding material as well as an injection unit for injecting and charging melted resin into a mold.

In such a pre-plasticization-type injection molding machine, a molding material is supplied from a hopper to the interior of a barrel of the plasticizing unit, and the molding material is plasticized and melted by rotation of a screw disposed within the barrel. The thus-melted resin is discharged from a resin exit provided at the tip end of the barrel to be fed, via a resin passage portion, to the interior of the tip end portion of an injection cylinder of the injection unit. The thus-fed resin is measured and accumulated within the injection cylinder. During measuring, an injection plunger of the injection cylinder retracts. After completion of measuring, the injection plunger is advanced in order to inject and charge the resin into a cavity of a mold.

The pre-plasticization-type injection molding machine involves a problem in that during injection, the measured resin flows backward via the resin passage portion to the interior of the barrel. Therefore, a valve section is added to the resin passage portion in order to open and close the resin passage. During measuring, the valve section is opened in order to allow passage of resin, and during injection, the valve section is closed in order to shut off the resin passage, thereby preventing backflow of the resin at the resin passage portion.

In such a conventional pre-plasticization-type injection molding machine, a valve section is added to the resin passage portion, and a drive section for opening and closing the valve section is provided. Therefore, the resin passage portion must be formed to have a special internal structure and shape. Further, a dedicated drive section for opening and closing the valve section, such as a hydraulic cylinder, must be provided. This results in a complex structure of the resin passage portion, decreased reliability, and increased cost.

When a movable portion is driven to effect both rotary motion and linear motion in a motor-driven molding machine, each motion generally requires one drive motor. Further, a drive system for advancing and retracting a movable portion requires, in addition to a drive motor, a motion conversion mechanism such as a ball screw mechanism for converting rotary motion of the drive motor into linear motion. Therefore, the number of parts increases, the overall structure becomes complicated, the overall size and cost increase, and reliability is lowered.

SUMMARY OF THE INVENTION

An object of the present invention is to provide a drive motor which can simplify the overall structure of a drive apparatus utilizing the motor, can decrease the size and cost of the drive apparatus, and can improve the reliability of the drive apparatus.

Another object of the present invention is to provide a drive motor which can secure smooth rotational movement and smooth advancement/retraction movement, which has a short overall axial length, and which secures sufficient thrust in the advancement/retraction direction.

Still another object of the present invention is to prove a drive apparatus for a molding machine utilizing such a drive motor.

To achieve the above-described objects, the drive motor of the present invention has a shaft supported by a casing to be rotatable and movable in the axial direction over a predetermined stroke. A portion of the shaft is utilized in order to form a rotary motor section for rotating the shaft, and another portion of the shaft is utilized in order to form an electromagnetic plunger section for moving the shaft in the axial direction. The rotary motor section and the electromagnetic plunger section are integrally built in the casing.

A drive apparatus for a molding machine according to the present invention utilizes the above-described drive motor. The front end of the shaft is connected to the rear end of a screw disposed within a barrel of a plasticizing unit of a pre-plasticization-type injection molding machine. Through axial movement of the shaft, a resin passage of the barrel is opened and closed by a valve portion provided at the front end of the screw.

In another drive apparatus for a molding machine according to the present invention, the tip end of the shaft is connected to a mold exchange rotary table for supporting a plurality of molds.

DETAILED DESCRIPTION OF THE PREFERRED EMBODIMENTS

Embodiments of the present invention will now be described in detail with reference to the drawings. The accompanying drawings are illustrative of the embodiments and are not meant to limit the scope of the invention. For clarification of the invention, detailed description of known parts is omitted.

The structure of a drive motor 1 of one embodiment will be described with reference to FIGS. 1 to 4.

Figure 1:
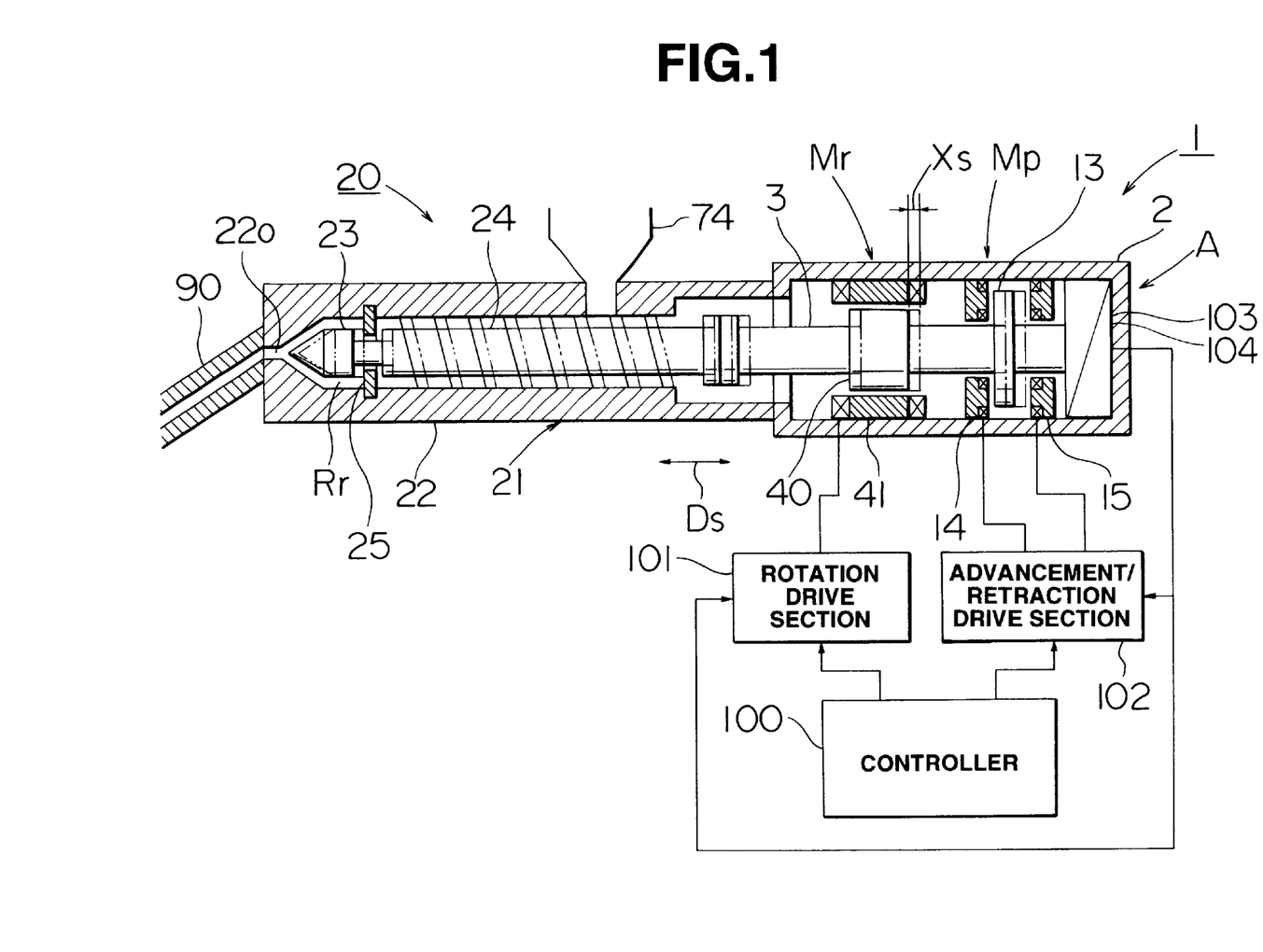
FIG. 1 is a partial schematic view of a pre-plasticization-type injection molding machine including a drive motor operated according to the principle of the present invention.

First, in order to facilitate understanding of the present invention, the principle of the drive motor 1 will be described with reference to FIG. 1. The drive motor 1 has a casing 2, which supports a shaft 3 disposed therein such that the shaft 3 is rotatable and is movable in an axial direction Ds over a predetermined stroke Xs. A portion (specifically, a front-side portion) of the shaft 3 is used to form a rotary motor section Mr for rotating the shaft 3, and another portion (a rear-side portion) of the shaft 3 is used to form an electromagnetic plunger section Mp for moving the shaft 3 in the axial direction Ds.

In the present embodiment, the rotary motor section Mr includes a rotor 40 fixed to the shaft 3 and a stator 41 fixed to the casing 2, which together constitute a synchronous servomotor. The electromagnetic plunger section Mp is composed of a magnetic attraction plate 13 fixed to the shaft 3, and electromagnetic plates 14 and 15 fixed to the casing 2 such that they are opposed to the magnetic attraction plate 13 in order to attract the plate 13. The rotary motor section Mr and the electromagnetic plunger section Mp are integrally built in the casing 2.

The stator 41 of the rotary motor section Mr is connected to a rotation drive section 101, and the electromagnetic plates 14 and 15 of the electromagnetic plunger section Mp are connected to an advancement/retraction drive section 102. Further, the rotation drive section 101 and the advancement/retraction drive section 102 are connected to a controller 100. The casing 2 further accommodates a rotary encoder 103 for detecting the rotational position (the number of revolutions) of the shaft 3, as well as a linear scale 104 for detecting the axial position of the shaft 3. The rotary encoder 103 is connected to the rotation drive section 101, and the linear scale 104 is connected to the advancement/retraction drive section 102.

Thus, the rotary motor section Mr can rotate the shaft 3, whereas the electromagnetic plunger section Mp can move the shaft 3 in the axial direction Ds over the predetermined stroke Xs, which is defined by an unillustrated limit mechanism. The thrust of the electromagnetic plunger section Mp can be adjusted through a change in the amount of current supplied to the electromagnetic plates 14 and 15. Further, the axial position (stop position) of the shaft 3 can be controlled through control such that the current supplied to the electromagnetic plates 14 and 15 is controlled based on the result of detection performed by the linear scale 104.

Next, the specific structure of the drive motor 1 according to the present embodiment will be described in detail with reference to FIGS. 2 to 4.

Figure 2:
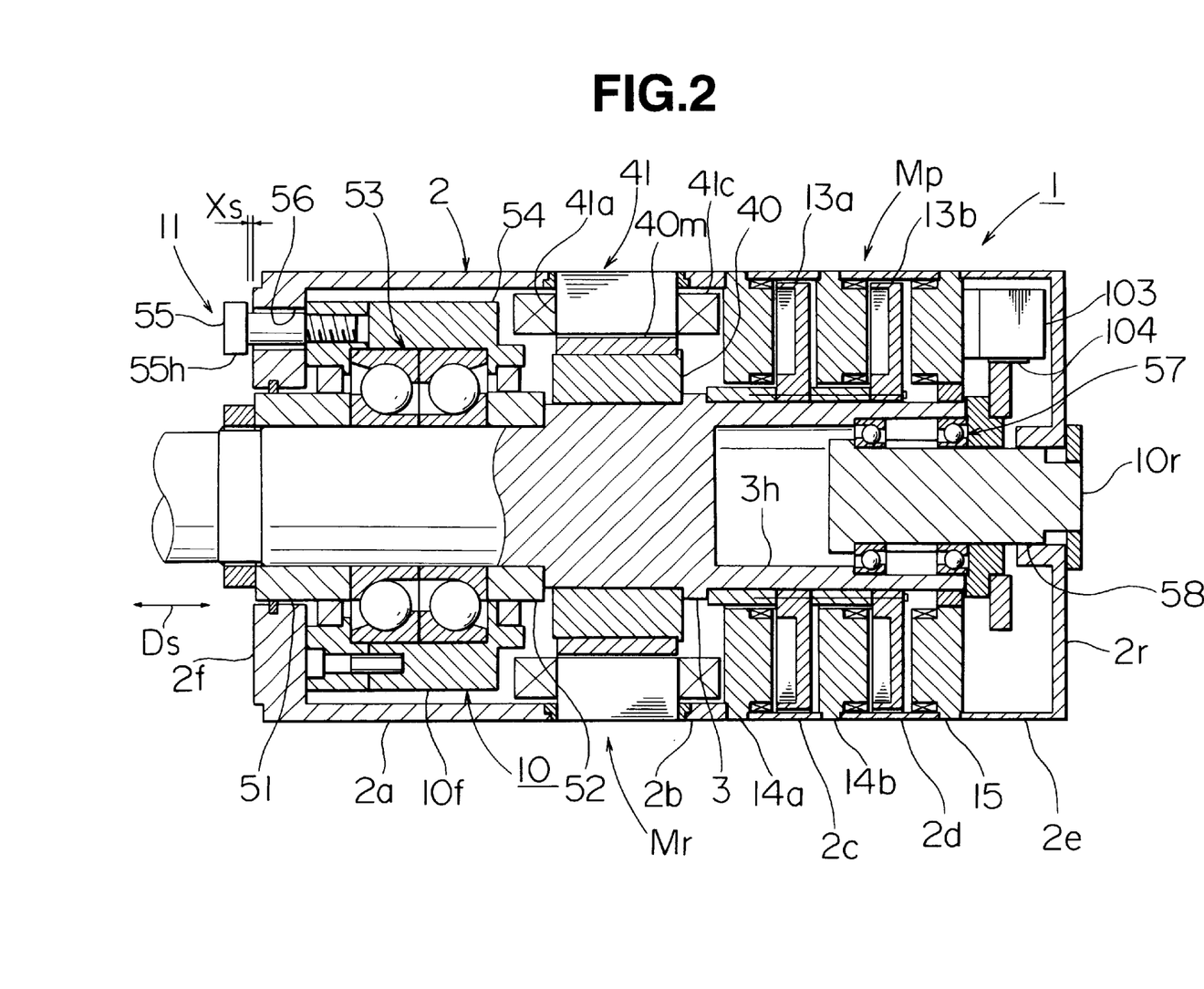
FIG. 2 is a sectional side view of a drive motor according, to an embodiment of the present invention.

In FIG. 2, numeral 2 denotes a casing of the drive motor 1. The casing 2 is composed of a front casing portion 2a having a front face portion 2f at the front end of a cylindrical portion thereof, cylindrical intermediate casing portions 2b, 2c, and 2d, and a rear casing portion 2e having a rear face portion 2r at the rear end of a cylindrical portion thereof. A stator 41 constituting a rotary motor section Mr is disposed between the front casing portion 2a and the intermediate casing portion 2b. An electromagnetic plate 14a for advancing the shaft 3 by attraction is disposed between the intermediate casing portions 2b and 2c, and an electromagnetic plate 14b for advancing the shaft 3 by attraction is disposed between the intermediate casing portions 2c and 2d. Further, an electromagnetic plate 15 for retracting the shaft 3 by attraction is disposed between the intermediate casing portion 2d and the rear casing portion 2e. Positioning portions each having a stepped shape are provided at engagement portions between adjacent casing portions. After assembly, the casing sections 2a, 2b, 2c, 2d, and 2e are integrated through use of unillustrated fasteners.

Each of the stator 41 and the electromagnetic plates 14a, 14b, and 15 has an overall annular shape and allows the shaft 3 to pass through the central space thereof. The shaft 3 is rotatably supported by a support mechanism 10 composed of a front support 10f and a rear support 10r, which are supported by the casing 2 to be movable in the axial direction Ds.

The front support 10f includes front bearings 53 and a support ring 54. The inner races of the front bearings 53 are fixed to the front portion of the shaft 3 by fixation rings 51 and 52. The support ring 54 is fixed to the outer races of the front bearings 53. A limit mechanism 11 is disposed between the support ring 54 and the front face portion 2f in order to limit the movement of the shaft 3 to within the predetermined stroke Xs. The limit mechanism 11 includes a limit bolt 55 having a threaded portion at its tip end. The limit bolt 55 is inserted from the outside into a through-hole 56 formed in the front face portion 2f, and the threaded portion is screwed into the support ring 54 such that the limit shaft 55 becomes parallel to the shaft 3. The movement of the shaft 3 is restricted to within the predetermined stroke Xs through engagement of the end surface of the support ring 54 with the inner surface of the front face portion 2f, as well as engagement of a head portion 55h of the limit bolt 55 with the outer surface of the front face portion 2f. Therefore, the stroke Xs can be adjusted through a change in the projection length of the limit bolt 55, which is achieved through rotation of the limit bolt 55.

The rear support 10r includes rear bearings 57 and a sub shaft 58. The outer races of the rear bearings 57 are fixed to a concave portion 3h formed in the rear end portion of the shaft 3. The sub shaft 58 is supported by the inner races of the rear bearings 57. The sub shaft 58 projects rearward from the rear end of the shaft 3, and its rear portion is supported by the center portion of the rear face portion 2r to be movable in the axial direction Ds.

By virtue of the above-described structure, the shaft 3 is rotatably supported by the support ring 54 and the sub shaft 58 via the front bearings 53 and the rear bearings 57, respectively, and the support ring 54 and the sub shaft 58 are supported by the casing 2 to be movable in the axial direction Ds over the predetermined stroke Xs. This structure secures smooth rotation and smooth advancement/retraction of the shaft 3.

An intermediate portion of the shaft 3A is used to form a rotary motor section Mr for rotating the shaft 3. The rotary motor section Mr includes the above-described stator 41 and a rotor (magnet rotor) 40. The rotor 40 is fixed to the intermediate portion of the shaft 3 and is opposed to the stator 41. The rotor 40 and the stator 41 constitute a synchronous servomotor. In the present embodiment, the stator 41 has stator coils 41c wound around core portions 41a provided at regular circumferential intervals, and the rotor 40 has a plurality of magnets 40m disposed in the circumferential direction.

Further, a portion of the shaft 3 at the rear of the rotary motor section Mr is used to form an electromagnetic plunger section Mp for moving the shaft 3 in the axial direction Ds. The electromagnetic plunger section Mp includes front and rear magnetic attraction plates 13a and 13b fixed to the shaft 3. The front magnetic attraction plate 13a is disposed between the electromagnetic plates 14a and 14b, and the rear magnetic attraction plate 13b is disposed between the electromagnetic plates 14a and 15.

Figure 3:
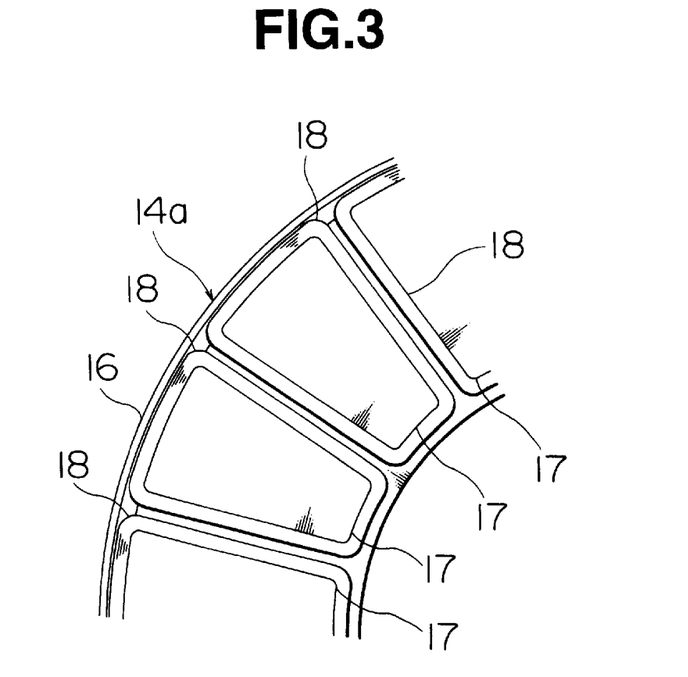
FIG. 3 is a partial view of an electromagnetic plate use in an electromagnetic plunger section of the drive motor.
Figure 4:
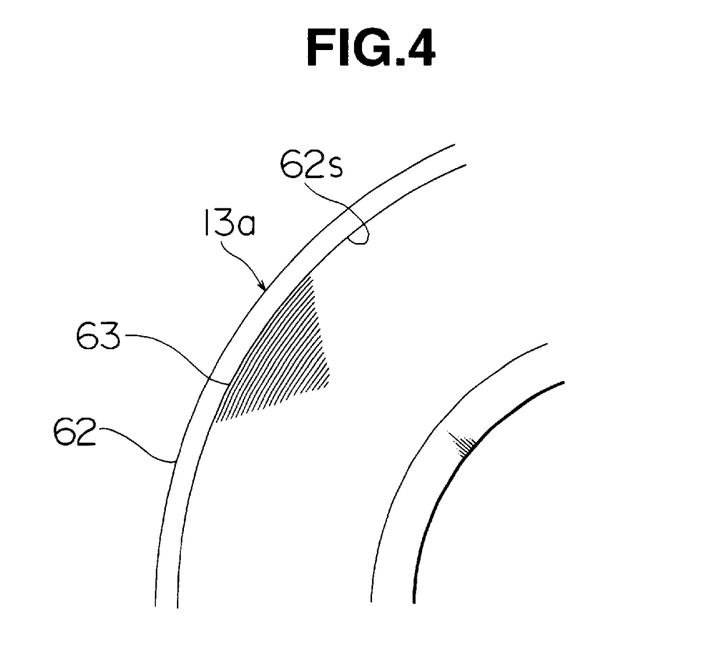
FIG. 4 is a partial view of a magnetic attraction plate used in the electromagnetic plunger section of the drive motor.

In the present embodiment, as shown in FIG. 3, each of the electromagnetic plates 14a, 14b, and 15 has an annular base plate 16 fixed to the casing 2; a plurality of core portions 17 projecting from the base plate 16 toward the magnetic attraction plate 13a or the attraction plate 13b; and coils 18 wound around the core portions 17. The electromagnetic plates 14a and 14b are disposed such that their core portions 17 face rearward, and the electromagnetic plate 15 is disposed at the rear of the electromagnetic plate 14b such that its core portions 17 face frontward. Further, as shown in FIG. 4, each of the magnetic attraction plates 13a and 13b has an annular base plate 62 having an accommodation portion 62s on one side of its outer surface, as well as an attraction member 63 accommodated within the accommodation portion 62s and formed of a long silicon-steel strip wound in an annular shape. The magnetic attraction plates 13a and 13b are disposed such that their attraction members 63 face forward. The reason why two electromagnetic plates 14a and 14b and two magnetic attraction plates 13a and 13b are provided for advancing the shaft by attraction is to increase the forward thrust. In the present embodiment, only weak rearward thrust is required. The above-described structure shortens the overall axial length, while securing sufficient thrust in the advancement/retraction direction.

When the electromagnetic plates 14a and 14b for advancing the shaft 3 by attraction are excited, the magnetic attraction plates 13a and 13b are attracted forward, and the shaft 3 stops at a position where the support ring 54 abuts the inner surface of the front face portion 2f. At this time, a clearance of about 0.5 mm is formed between the electromagnetic plate 14a and the magnetic attraction plate 13a, as well as between the electromagnetic plate 14b and the magnetic attraction plate 13b. When the excitation of the electromagnetic plates 14a and 14b is stopped and the electromagnetic plate 15 for retracting the shaft 3 by attraction is excited, the magnetic attraction plate 13b is attracted rearward, and the shaft 3 stops at a position where the head portion 55h of the limit bolt 55 abuts the outer surface of the front face portion 2f. At this time, a clearance of about 0.5 mm is formed between the electromagnetic plate 15 and the magnetic attraction plate 13b. A rotary encoder 103 for detecting the rotational speed of the shaft 3 and a linear scale 104 for detecting the axial position of the shaft 3 are disposed within the inner space of the rear casing section 2r.

Figure 5:
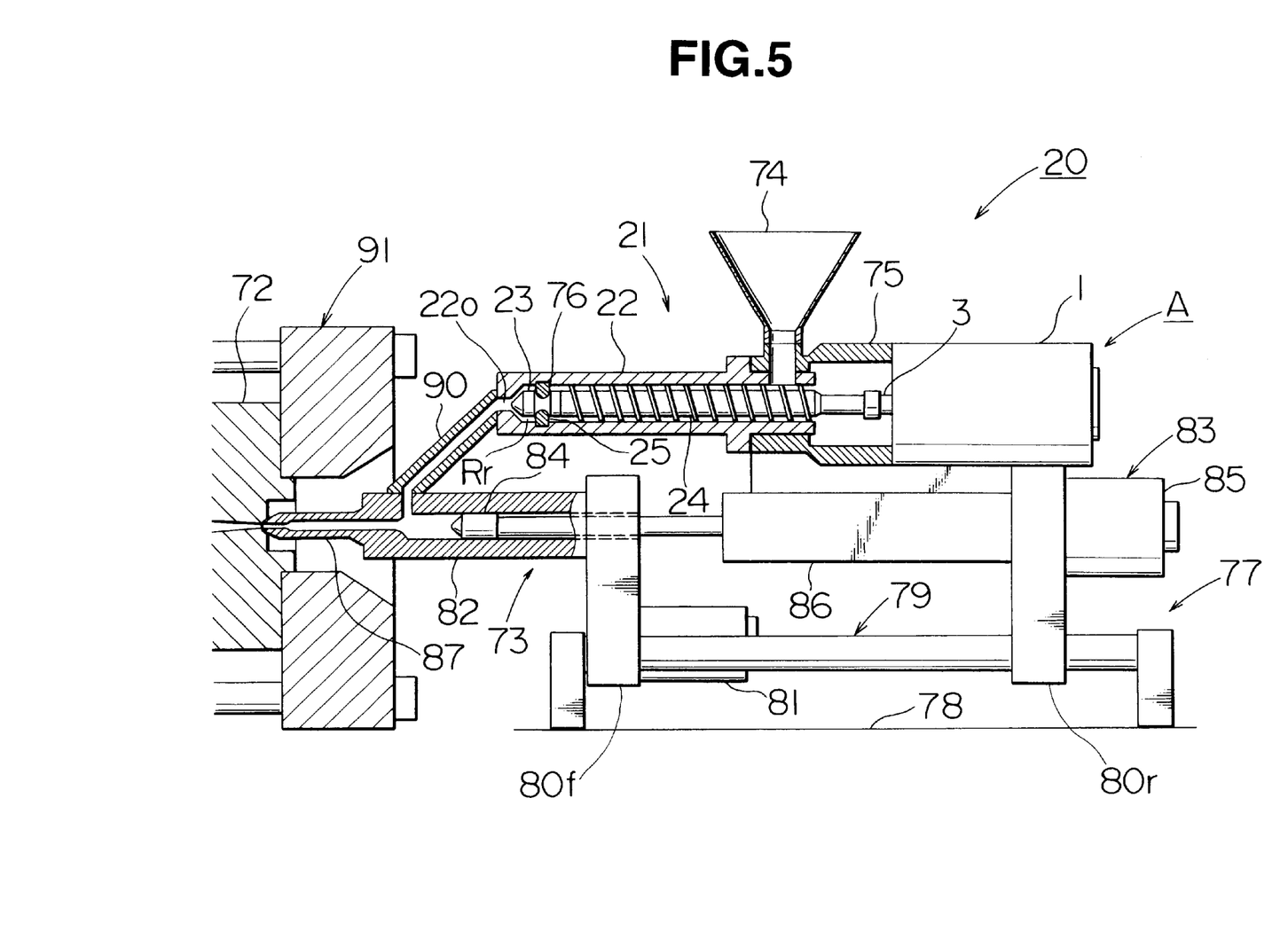
FIG. 5 is a partial sectional view of a pre-plasticization-type injection molding machine equipped with a drive apparatus according to the embodiment.

The drive motor 1 having the above-described structure can be used as a drive apparatus A of a pre-plasticization-type injection molding machine 20 shown in FIG. 5.

Next, the structure of the pre-plasticization-type injection molding machine 20 shown in FIG. 5 will be described. The pre-plasticization-type injection molding machine 20 has, as independent units, a plasticizing unit 21 for plasticizing and melting a molding material, and an injection unit 73 for injecting and charging melted resin into a mold 72.

The plasticizing unit 21 includes a barrel 22, and a hopper 74 is provided at the rear portion of the barrel 22. The rear end of the barrel 22 is coupled to the front end of the drive motor 1 via a machine body 75. Further, a screw 24 is inserted into the interior of the barrel 22, and the rear end of the screw 24 is coupled to the front end of the shaft 3 of the drive motor 1. Thus is constructed the drive apparatus A for rotating and reciprocating the screw 24.

Meanwhile, a circumferentially extending annular groove 76 is formed at the front end portion of the screw 24 in order to provide a valve portion 23 on the front side of the groove 76. Further, an annular valve seat member 25 is attached to the inner circumferential surface of the barrel 22 such that the valve seat member 25 extends from the inner circumferential surface of the barrel 22 to enter the annular groove 76. When the screw 24 is moved rearward until the valve portion 23 abuts the valve seat member 25, a resin passage Rr within the barrel 22 is shut off. When the screw 24 is advanced from that position by a few millimeters, the valve portion 23 separates from the valve seat member 25, so that the resin passage Rr is opened.

The injection unit 73 is supported by a molding machine moving unit 77. The molding machine moving unit 77 includes a tie-bar mechanism 79 disposed on the top surface of a machine base 78, and front and rear support plates 80f and 80r supported on the tie-bar mechanism 79 to be movable in the front/back direction. The support plates 80f and 80r are advanced and retracted by a drive mechanism 81. The injection unit 73 has an injection cylinder 82 and a plunger drive mechanism 83. The injection cylinder 82 is attached to the front surface of the front support plate 80f and projects forward. The plunger drive mechanism 83 is attached to the rear support plate 80r. An injection plunger 84 is inserted into the injection cylinder 82, and the rear end of the injection plunger 84 is coupled to the plunger drive mechanism 83. The plunger drive mechanism 83 includes a motor 85 and a ball screw mechanism 86 which converts rotational motion output from the motor 85 into linear motion in order to move the injection plunger 84 in the front/back direction. Instead of the ball screw mechanism 86, another type of mechanism having the same function, such as a roller screw mechanism or an air drive mechanism, may be used for moving the injection plunger 84 in the front/back direction.

The injection cylinder 82 has an injection nozzle 87 at its front end. The front end portion of the interior of the injection cylinder 82 is connected to the resin exit 22o of the plasticizing unit 21 via an inclined pipe-shaped resin passage portion 90. The rear end portion of the injection unit 73, including the support plate 80r, is connected to the bottom portion of the plasticizing unit 21. Identical portions in FIGS. 1 and 5 are denoted by identical reference numerals.

Figure 6:
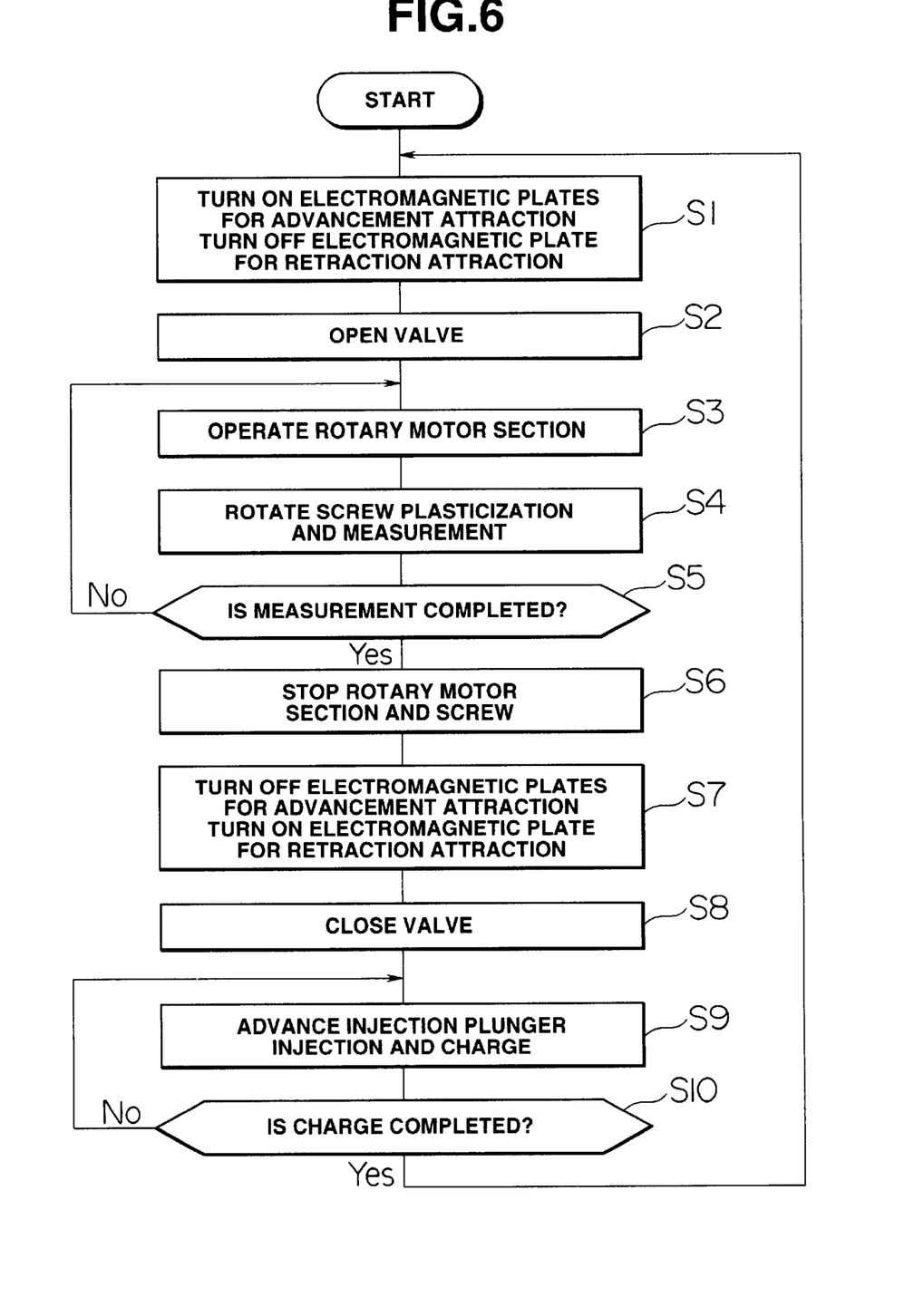
FIG. 6 is a flowchart showing the operation of the pre-plasticization-type injection molding machine.

Next, the operation of the pre-plasticization-type injection molding machine 20, including the operation of the drive motor 1, will be described with reference to the flowchart shown in FIG. 6.

At the beginning of measuring, the electromagnetic plates 14a and 14b (14) of the electromagnetic plunger section Mp are in an excited state, and the electromagnetic plate 15 is in an unexcited state (step S1). In this state, the magnetic attraction plates 13a and 13b (13) are attracted by the excited electromagnetic plates 14a and 14b (14), so that the screw 24 moves to a position indicated by a solid line in FIG. 1. As a result, the valve portion 23 separates from the valve seat member 25 in order to open the resin passage Rr (step S2). At this time, the movement of the shaft 3 is restricted by the limit mechanism 11.

Subsequently, a rotation command signal is output from the controller 100 to the rotation drive section 101, so that the rotation drive section 101 drives and controls the rotary motor section Mr (step S3). In this case, the rotary motor section Mr serves as a servomotor. The rotation speed detected by the rotary encoder 103 is fed to the rotation drive section 101, so that the rotary motor section Mr is feedback-controlled to rotate at a preset speed. Meanwhile, a molding material is supplied from the hopper 74 to the interior of the barrel 22, and the thus-supplied molding material is plasticized and melted through rotation of the screw 24. Further, the melted resin is discharged from the resin exit 22o of the barrel 22 and is fed, via the resin passage portion 90, to the front end side of the injection cylinder 82 of the injection unit 73. The thus-fed resin is measured and accumulated within the injection cylinder 82 (step S4).

During measuring, the injection plunger 84 retracts. When the melted resin is accumulated in a preset amount by means of measuring, the rotary motor section Mr is stopped (step S5 and S6). Also, a valve close command is output from the controller 100 to the advancement/retraction drive section 102. Thus, the electromagnetic plates 14a and 14b (14) of the electromagnetic plunger section Mp are brought into the unexcited state, and the electromagnetic plate 15 is excited (step S7). As a result, the magnetic attraction plate 13b (13) is attracted by the excited electromagnetic plate 15, so that the screw 24 moves to a position indicated by an imaginary line in FIG. 1; i.e., a position where the valve portion 23 abuts the valve seat member 25 in order to close the resin passage Rr (step S8).

Subsequently, the injection unit 73 is driven and controlled. As a result, the injection plunger 84 advances in order to inject and charge the resin accumulated in the injection cylinder 84 into the cavity of the mold 72 (step S9). Upon completion of the injection, a valve open command signal is output from the controller 100 to the to the advancement/retraction drive section 102. Thus, the electromagnetic plates 14a and 14b (14) of the electromagnetic plunger section Mp are excited, and the electromagnetic plate 15 is brought into the unexcited state (step S10, S1). In this way, one molding cycle is completed, and then the same operation is repeated.

As described above, the drive motor 1 and the drive apparatus A for a molding machine according to the present invention have the following advantages. Since the rotary motor section Mr and the electromagnetic plunger section Mp sharing the shaft 3 are integrally built in the drive motor 1, the shaft 3 can be rotated through drive and control of the rotary motor section Mr, and can be moved in the axial direction Ds through drive and control of the electromagnetic plunger section Mp. As a result, the drive mechanism can be simplified considerably, and due to the reduction in the number of parts, the overall structure can be simplified and made compact. In addition, the reliability is improved, and the overall cost is lowered.

Next, with reference to FIG. 7, there will be described a drive apparatus Ae for a molding machine according to another embodiment of the present invention in which the above-described drive motor 1 is utilized.

Figure 7:
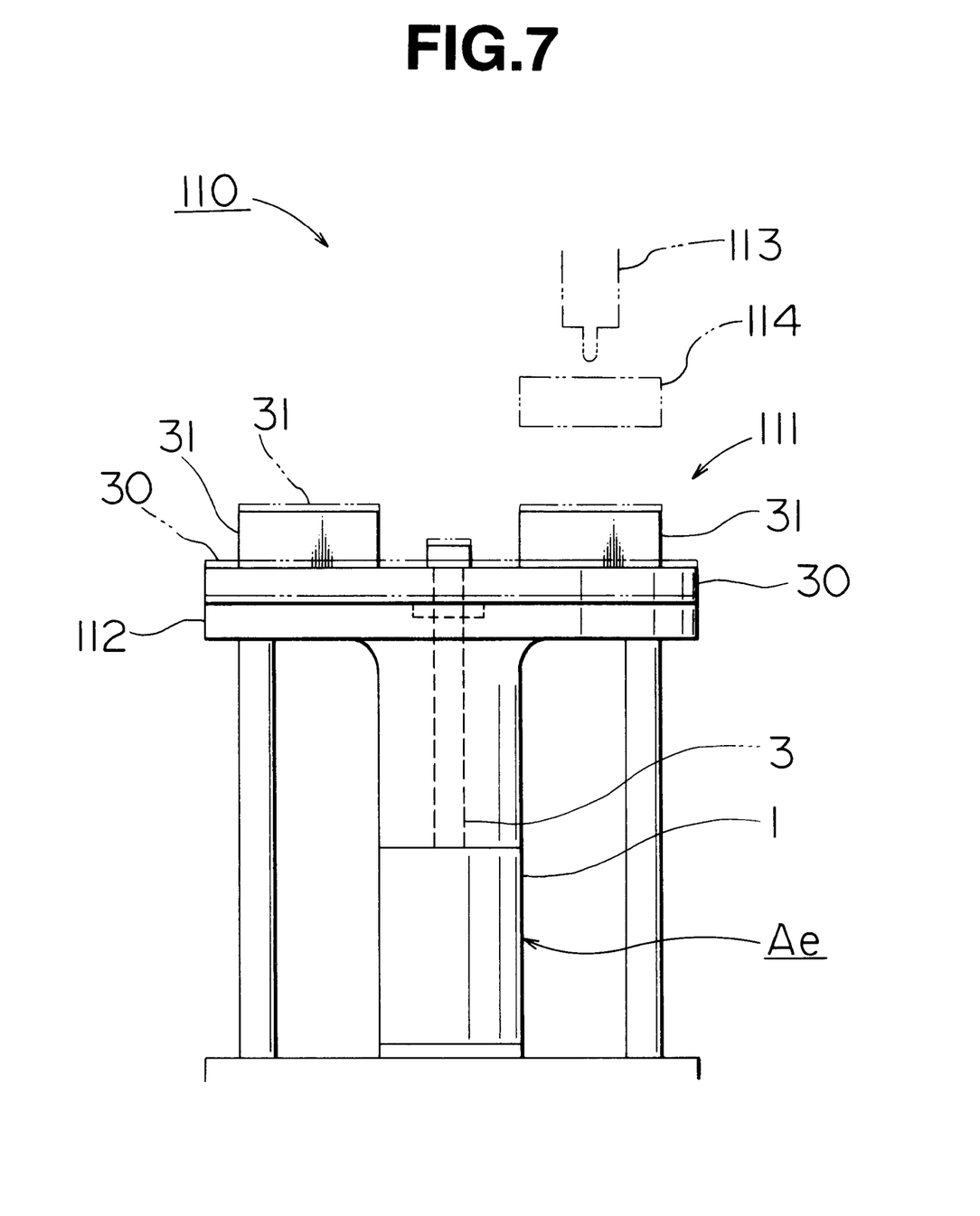
FIG. 7 is a view of a rotary table mechanism equipped with a drive apparatus according to the embodiment.

FIG. 7 shows a rotary table mechanism 111 provided on a molding machine 110. The tip end of the shaft 3 of the drive moor 1 is connected to a mold exchange rotary table 30 which supports a plurality of molds (stationary molds) 31.

When the rotary table 30 is to be rotated, the electromagnetic plunger section Mp of the drive motor 1 is first driven in order to advance (raise) the shaft 3 to thereby raise the rotary table 30 on a base 112 to a position indicated by an imaginary line. As a result, the rotary table 30 separates from the base 112. In this state, the rotary motor section Mr is driven and controlled in order to rotate the rotary table 30 by, for example, 180° to thereby exchange the molds (stationary molds) 31. In this case, the stop position of the molds (stationary molds) 31 may be detected by use of the above-described rotary encoder 103 or a separately provided positional detector (e.g., separate encoder, or limit switch). After the rotation of the rotary table 30 is completed, the electromagnetic plunger section Mp is again driven to retract (lower) the shaft 3 in order to seat the rotary table 30 on the base 112. Numeral 113 denotes an injection unit, and numeral 114 denotes a plasticizing unit.

By the way, in a drive mechanism for causing a movable portion, such as the rotary table 30, to effect different kinds of motions, in addition to a drive apparatus for rotating the rotary table 30, a drive apparatus for raising and lowering the rotary table 30 is required. Therefore, the drive apparatus becomes complex and large, and thus production cost increases. However, in the present embodiment, the above-described problem can be solved, since two kinds of motions can be output through use of a single drive motor 1. Although a vertical type molding machine is shown in FIG. 7, the drive apparatus of the present embodiment can be applied to a horizontal type molding machine.

The present invention is not limited to the above-described embodiment. Regarding structural details, approaches, and the like, modifications and any omission or addition may be possible as needed without departing from the scope of the invention.

For example, in the embodiments, the pre-plasticization-type injection molding machine 20 and the rotary table mechanism 111 used for exchanging molds are described as example apparatus to which the drive motor 1 and the drive apparatuses A and Ae for a molding machine are applied. However, they can be applied to other similar drive mechanisms in which two kinds of motions are combined. In this case, the drive motor 1 can be applied to apparatus other than molding machines. Further, the number of sets of the electromagnetic plates 14a, etc., and the magnetic attraction plates 13a, etc may be freely selected in accordance with a desired thrust force and the like. An elastic member such as a spring may be used for movement in one direction in the electromagnetic plunger section Mp. The expression "the rotary motor section Mr and the electromagnetic plunger section Mp are integrally built in the casing 2" means that the rotary motor section Mr and the electromagnetic plunger section Mp are constructed in an integrated manner and does not mean that the casing 2 itself is a single body. Therefore, there are not excluded a case where the casing 2 is composed of separate members or assembled members.

Further, the positions and structures of the front bearings 53 and the rear bearings 57 are not limited to those disclosed in the drawings, and the front bearings 53 and the rear bearings 57 may have various configurations insofar as they provide the same function. Further, the axial positions of the rotary motor section Mr and the electromagnetic plunger section Mp may be exchanged, and the valve portion 23 may have such a structure that it closes when moved forward.

What is claimed is:

1. A drive motor comprising:

a casing;

a shaft supported centrally by said casing to be rotatable and movable in an axial direction over a predetermined stroke;

a rotary motor section formed through utilization of a portion of said shaft and adapted to rotate said shaft;

a support mechanism supported by said casing to be movable in the axial direction and adapted to rotatably support said shaft, wherein said support mechanism includes a front support and a rear support, said rear support engaged with said casing and including a sub shaft and at least one rear bearing; and an electromagnetic plunger section formed through utilization of another portion of said shaft and adapted to move said shaft in the axial direction, wherein said electromagnetic plunger section comprises at least one magnetic attraction plate fixed to said shaft and at least one electromagnetic plate fixed to said casing such that each electromagnetic plate faces each magnetic attraction plate in order to attract said magnetic attraction plate, said rotary motor section and said electromagnetic plunger section are integrally built in said casing, and a base plate fixed to said casing, a plurality of core portions projecting from said base plate toward said magnetic attraction plate, and coils wound around said core portions.

2. A drive motor according to claim 1, wherein said casing includes a rotary encoder for detecting a rotational position of the shaft and a linear scale for detecting an axial position of the shaft.

3. A drive motor according to claim 1, wherein the electromagnetic plunger section includes front and rear magnetic attraction plates fixed to the shaft, the front magnetic attraction plate is disposed between a plurality of electromagnetic plates and the rear magnetic attraction plate is disposed between a plurality of electromagnetic plates.

4. A drive motor according to claim 3, wherein each magnetic attraction plate includes an annular base plate having an accommodation portion on an outer surface of said annular base plate and an attraction member formed within the accommodation portion.

5. A drive motor according to claim 4, wherein the attraction member is formed of a long silicon-steel strip wound in an annular shape.

6. A drive motor according to claim 4, wherein the magnetic attraction plates are disposed so that the attraction members face in a forward direction of said shaft.

7. A drive motor according to claim 6 comprising two electromagnetic plates and two magnetic attraction plates provided for advancing the shaft by attraction and to increase the forward thrust.

8. A drive motor according to claim 1, further comprising a limit mechanism disposed between a support mechanism and said casing and adapted to limit movement of said shaft within the predetermined stroke.

9. A drive motor according to claim 1, said front support including a support ring and at least one front bearing, wherein said shaft is rotatably supported by said support ring and front bearing and said sub shaft and said rear bearing.

10. A drive motor according to claim 9, wherein said support ring and said sub shaft are supported by said casing and movable in the axial direction over the predetermined stroke.

11. A drive motor comprising:

a casing;

a shaft supported centrally by said casing to be rotatable and movable in an axial direction over a predetermined stroke;

a support mechanism supported by said casing to be movable in the axial direction and adapted to rotatably support said shaft;

a limit mechanism disposed between said support mechanism and said casing and adapted to limit an axial movement of said shaft within the predetermined stroke, wherein said axial movement is limited when said limit mechanism operatively contacts said support mechanism;

a rotary motor section formed through utilization of a portion of said shaft and adapted to rotate said shaft; and an electromagnetic plunger section formed through utilization of another portion of said shaft and adapted to move said shaft in the axial direction, wherein said electromagnetic plunger section comprises at least one magnetic attraction plate fixed to said shaft and at least one electromagnetic plate fixed to said casing such that each electromagnetic plate faces each magnetic attraction plate in order to attract said magnetic attraction plate, said rotary motor section and said electromagnetic plunger section are integrally built in said casing, and a base plate fixed to said casing, a plurality of core portions projecting from said base plate toward said magnetic attraction plate, and coils wound around said core portions.

* * * * *